April 1, 1947. C. E. SMITH 2,418,238
ELECTRO-MECHANICAL CALCULATOR
Filed Oct. 29, 1942 3 Sheets—Sheet 2
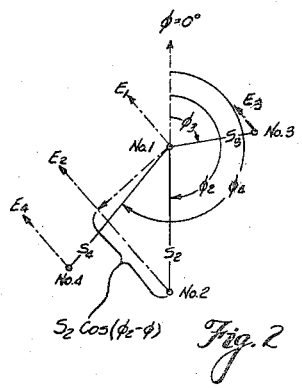
Fig. 2
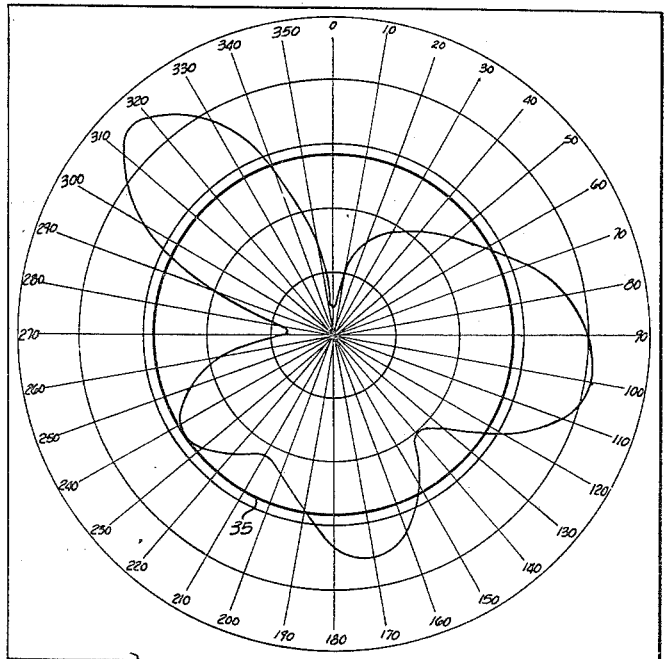
Fig. 7
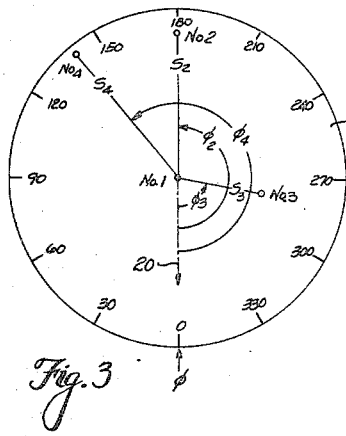
Fig. 3
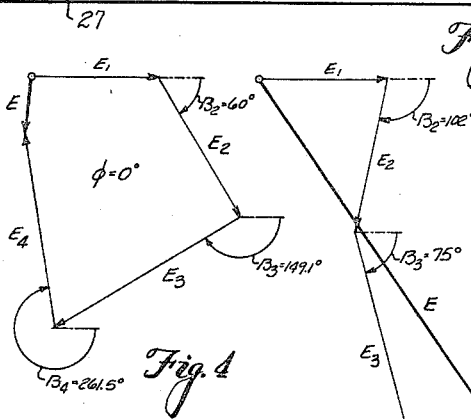
Fig. 4
Fig. 6
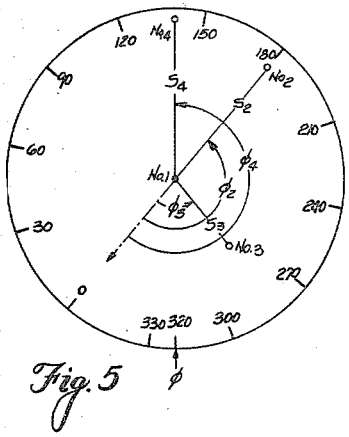
Fig. 5
INVENTOR.
Carl E. Smith
BY
Woodling and Krost
attys April 1, 1947.  C. E. SMITH  2,418,238
ELECTRO-MECHANICAL CALCULATOR
Filed Oct. 29, 1942  3 Sheets—Sheet 3

INVENTOR.
Carl E. Smith
BY
Hoodling and Krost
attys

Patented Apr. 1, 1947

2,418,238

UNITED STATES PATENT OFFICE 2,418,238

ELECTROMECHANICAL CALCULATOR

Carl E. Smith, Arlington, Va.

Application October 29, 1942, Serial No. 463,846

8 Claims. (Cl. 235—61)

My invention relates in general to an electromechanical mechanism for solving equations which may be solved vectorially and more particularly to an electro-mechanical directional antenna pattern calculator.

While I will describe my invention as being embodied in an electro-mechanical directional antenna pattern calculator, yet it is to be understood that my invention may be embodied in other forms to solve other problems of a similar or varied nature.

The outstanding problem in antenna design is always to control the distribution of the radiated energy in some desired manner. The radiation pattern or space characteristic, is a geometrical description of the manner in which the radiant energy is distributed in space around the radiators or antennas. The horizontal pattern represents the distribution in the ground plane, and the various vertical plane patterns represent conditions in directions at various angles above the horizontal. The patterns are represented in polar graphs and may be drawn in terms of relative or actual field strength or power. The present description will be in terms of relative field intensities.

The field intensity in any direction from one or more antennas which radiate power at the same frequency can be calculated from a standard equation, provided sufficient conditions are known concerning the antennas, their arrangement and the distribution of power to them. The group of antennas used to radiate power is spoken of as the antenna array. The greater the number of antennas in an array, the more time and work is required to calculate the radiation pattern for that array. In order to design an array of antennas to give a definite desired pattern, it is often necessary to determine, by trial, the radiation pattern for several arrays before the correct array is selected. Consequently, a great amount of time and effort is entailed in the design of an antenna array for the purpose of getting a desired field intensity pattern.

In the design of an antenna array, it is electrically possible to mould the radiation pattern in almost any desired manner. As the number of radiators or antennas is increased, a greater degree of control becomes possible.

The general equation for the field intensity from a directional antenna array of any number of antennas, $n$, is:

$$\dot{E} = \sum_{k=1}^{k=n} E_k f_k(\theta) \epsilon^{j\beta_k} \qquad (1)$$

Equation 1 may be written in vector form as follows:

$$\dot{E} = \dot{E}_1 + \dot{E}_2 + \ldots \dot{E}_k + \ldots \dot{E}_n \qquad (2)$$

where $\dot{E}$ = The vector representing the total field from the array $\dot{E}_1$ = The vector representing the field from antenna No. 1

$\dot{E}_2$ = The vector representing the field from antenna No. 2

$\dot{E}_k$ = The vector representing the field from antenna No. $k$ $\dot{E}_n$ = The vector representing the field from antenna No. $n$ Each of the terms in the right hand side of Equation 2 may be expanded according to the Equation 1, as is shown in the following equation for the $k$th antenna only:

$$\dot{E}_k = E_k f_k(\theta) \epsilon^{j\beta_k} \qquad (3)$$

The several factors in the right hand side of Equation 3, are defined as follows:

$E_k$ = the horizontal magnitude of the field intensity produced by the $k$th antenna.

$f_k(\theta)$ = vertical radiation characteristic of the $k$th antenna having unity value along the horizon. In my invention this characteristic can have any desired shape.

$\epsilon^{j\beta_k}$ = a unit vector that determines the direction of the vector representing the field from the $k$th antenna.

$$f_k(\theta) = \frac{\cos(h_k \sin \theta) - \cos h_k}{(1 - \cos h_k) \cos \theta} \qquad (4)$$

Equation 4 is for the special case of a vertical antenna having sinusoidal current distribution with a current node at the top.

$$\epsilon^{j\beta_k} = \cos \beta_k + j \sin \beta_k \qquad (5)$$

$$\beta_k = S_k \cos(\phi_k - \phi) \cos \theta + \psi_k \qquad (6)$$

The nomenclature used is $\theta$ = elevation angle of observation point, $p$, from the horizontal in degrees $h_k$ = electrical height of $k$th antenna in degrees $S_k$ = electrical spacing of $k$th antenna from a space reference point in degrees.

$\phi_k$ = horizontal azimuth orientation angle of $k$th antenna with respect to a space reference axis.

$\phi$ = horizontal azimuth angle of the direction to the observation point, $p$.

$\psi_k$ = electrical phase angle of the field radiated from the $k$th antenna with respect to the phase angle of a field radiated from the space reference point.

$j=\sqrt{-1}$, imaginary operator.

$\epsilon=2.718$, the base of natural logarithms

By use of Equations 4, 5 and 6, Equation 3 may be written in component form to make Equation 7;

$$\dot{E}_k = \frac{\cos(h_k \sin\theta) - \cos h_k}{(1-\cos h_k)\cos\theta}$$
$$\{\cos[S_k \cos(\phi_k-\phi)\cos\theta+\psi_k]+$$
$$j\sin[S_k \cos(\phi_k-\phi)\cos\theta+\psi_k]\} E_k \quad (7)$$

For several antennas, the components as given in Equation 7 for one antenna may be added and the resultant vector written either in component vector form or combined to give the magnitude of the resultant field.

The description will deal with a four-element array, but it is to be understood that my invention may be applied to any number of elements. For a four-element antenna array, the following equation is accepted as a standard for calculating the relative field intensity in any direction, both horizontally and vertically.

The magnitude of the resultant field intensity, represented by E, for a four element array, having individual antennas of unequal height, is:

$$E = \sqrt{\begin{aligned}&\{\frac{\cos(h_1\sin\theta)-\cos h_1}{(1-\cos h_1)\cos\theta}E_1\cos[S_1\cos(\phi_1-\phi)\cos\theta+\psi_1]\\&+\frac{\cos(h_2\sin\theta)-\cos h_2}{(1-\cos h_2)\cos\theta}E_2\cos[S_2\cos(\phi_2-\phi)\cos\theta+\psi_2]\\&+\frac{\cos(h_3\sin\theta)-\cos h_3}{(1-\cos h_3)\cos\theta}E_3\cos[S_3\cos(\phi_3-\phi)\cos\theta+\psi_3]\\&+\frac{\cos(h_4\sin\theta)-\cos h_4}{(1-\cos h_4)\cos\theta}E_4\cos[S_4\cos(\phi_4-\phi)\cos\theta+\psi_4]\}^2\\&+\{\frac{\cos(h_1\sin\theta)-\cos h_1}{(1-\cos h_1)\cos\theta}E_1\sin[S_1\cos(\phi_1-\phi)\cos\theta+\psi_1]\\&+\frac{\cos(h_2\sin\theta)-\cos h_2}{(1-\cos h_2)\cos\theta}E_2\sin[S_2\cos(\phi_2-\phi)\cos\theta+\psi_2]\\&+\frac{\cos(h_3\sin\theta)-\cos h_3}{(1-\cos h_3)\cos\theta}E_3\sin[S_3\cos(\phi_3-\phi)\cos\theta+\psi_3]\\&+\frac{\cos(h_4\sin\theta)-\cos h_4}{(1-\cos h_4)\cos\theta}E_4\sin[S_4\cos(\phi_4-\phi)\cos\theta+\psi_4]\}^2\end{aligned}} \quad (8)$$

When the antenna heights are equal, Equation 8 simplifies to:

$$E = \frac{\cos(h\sin\theta)-\cos h}{(1-\cos h)\cos\theta}\sqrt{\begin{aligned}&\{E_1\cos[S_1\cos(\phi_1-\phi)\cos\theta+\psi_1]\\&+E_2\cos[S_2\cos(\phi_2-\phi)\cos\theta+\psi_2]\\&+E_3\cos[S_3\cos(\phi_3-\phi)\cos\theta+\psi_3]\\&+E_4\cos[S_4\cos(\phi_4-\phi)\cos\theta+\psi_4]\}^2\\&+\{E_1\sin[S_1\cos(\phi_1-\phi)\cos\theta+\psi_1]\\&+E_2\sin[S_2\cos(\phi_2-\phi)\cos\theta+\psi_2]\\&+E_3\sin[S_3\cos(\phi_3-\phi)\cos\theta+\psi_3]\\&+E_4\sin[S_4\cos(\phi_4-\phi)\cos\theta+\psi_4]\}^2\end{aligned}} \quad (9)$$

An object of my invention is the provision of an electro-mechanical mechanism adapted to solve equations of the type which may be solved vectorially.

Another object of my invention is the provision of an electro-mechanical mechanism adapted to solve equations which may be represented by the general vector equation, $$\dot{E} = \sum_{k=1}^{k=n} E_k f_k(\theta) \epsilon^{j\beta_k}$$

Another object of my invention is the provision of an electro-mechanical mechanism adapted to solve equations which may be represented by the general vector equation, $$\dot{E} = (\dot{E}_1 + \dot{E}_2 + \ldots + \dot{E}_n),$$

hereinafter referred to.

Another object of my invention is the provision of an electro-mechanical mechanism which will solve for the value of the radical expressed in the Equations 8 and 9 above.

Another object of my invention is the provision of an electro-mechanical mechanism for generating a movement corresponding to a cosine function and for transferring the said movement to the rotation of electrical equipment producing electrical conditions which combine to give a resultant electrical condition which may be read directly at any position throughout the complete cycle of the generated movement.

Another object of my invention is the provision of an electro-mechanical mechanism for generating a movement corresponding to a cosine function and for transferring the said movement to modify a plurality of electrical conditions which when affected by the generated movement provide for giving a resultant electrical condition at any position throughout the complete cycle of the generated movement.

Another object of my invention is the provision of an electro-mechanical mechanism for generating recurrent movement and for transferring the said movement to modify a plurality of electrical conditions which when affected by the generated movement provide for giving a resultant electrical condition at any position throughout the complete cycle of the generated movement.

Another object of my invention is the provision to specify independently the polarization and radiation characteristic of each element in the antenna array.

Another object of my invention is the provision of varying the generating recurrent motion as to amplitude and phase.

Another object of my invention is the provision for adjusting the magnitude and phase relation of an electrical condition with respect to a reference electrical condition.

Another object of my invention is the provision of an electro-mechanical mechanism adapted to facilitate the calculation of the relative field intensity of two or more antenna elements in any direction, both horizontally and vertically.

Other objects and a fuller understanding of my invention may be had by referring to the following description and claims, taken in conjunction with the accompanying drawings, in which:

Figure 2 is a plan view of a four element antenna array as actually installed in service, being an example of an installation for which my calculator can be used to determine both the vertical and horizontal patterns;

Figure 3 is a representation in a horizontal plan view of the position of the equivalent four-element antenna array as shown in Figure 2 when set off on my machine with a common reference point and with a common reference axis for solving for one value of the field in the horizontal pattern where the angle $\phi$ equals zero;

Figure 4 is a representation of the magnitude and the angle of the voltage vectors representing the conditions in the component parts of the machine, as obtained by the setting of the machine for the arrangement in Figure 3, which vectors when vectorially added give a resultant vector that represents a function of the value of the field intensity being solved, where the angle $\phi$ equals zero;

Figure 5 is a representation similar to Figure 3 for solving for another value of the field in the horizontal pattern, with the four-element antenna array rotated through an angle of $\phi=320°$;

Figure 6 is a vector representation similar to Figure 4 as obtained by the setting of the machine for the arrangement in Figure 5 for solving for another value of the field of the horizontal pattern where the angle $\phi=320°$;

Figure 7 is a polar diagram of a horizontal radiation pattern of the four-element antenna array as recorded by my pattern calculator, the resultant relative field for the settings in Figures 3 and 5 being shown at angles of 0° and 320° respectively;

Figure 1:
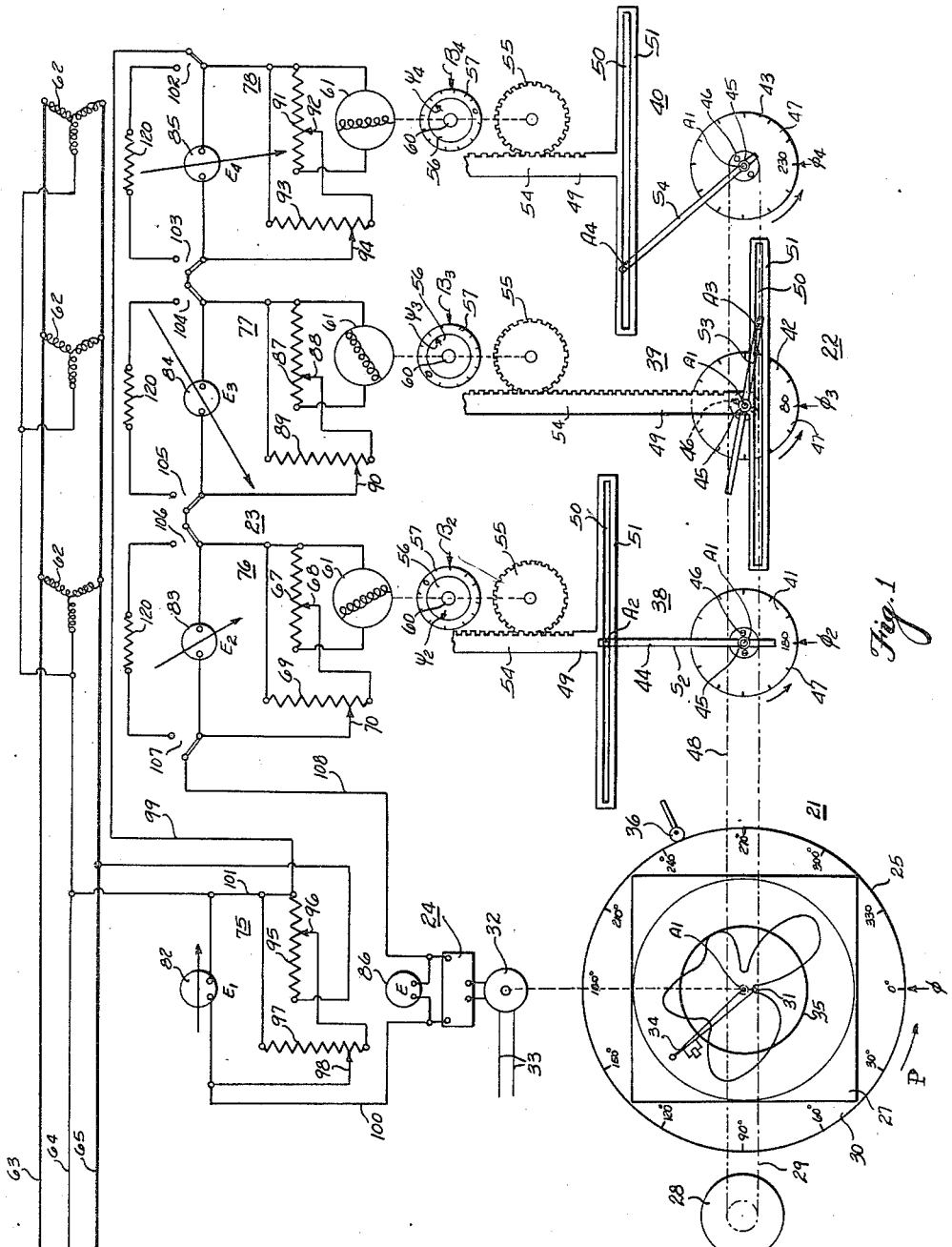
Figure 1 is a diagrammatic illustration of an electro-mechanical antenna array pattern calculator embodying features of my invention.

The Equations 8 and 9 above for a four-element array are derived from the vector addition of the four vectors which represent the strength of the signal from each of the four antennas arriving at a common point far removed from the antenna array. Each of the four vectors is dependent only on the radiation from its respective antenna with respect to the reference point or origin. A study of these vectors and their relationship with each other will now be developed, in conjunction with Figure 3 of the drawings, which diagrammatically illustrates a four-element array in an equivalent horizontal plan view, as set off on my machine in Figure 1.

Antenna No. 1 is chosen as the reference point or origin O, and the line 20 in the direction of angle $\phi=$zero degrees, establishes a directional reference line. Antenna No. 2 is spaced $S_2$ degrees from antenna No. 1 in a direction $\phi_2$ degrees from antenna No. 1 or from the reference line $\phi=0$, drawn through No. 1. Antenna No. 3 is spaced $S_3$ degrees from antenna No. 1 at an angle of $\phi_3$ degrees from the reference line for antenna No. 1. Antenna No. 4 is spaced $S_4$ degrees from antenna No. 1 in a direction $\phi_4$ degrees from the reference line for antenna No. 1. The current in antenna No. 1 is assumed to have a phase of zero degrees, while that of antenna No. 2 is $\psi_2$ degrees, that of antenna No. 3 is $\psi_3$ degrees and that of No. 4 is $\psi_4$ degrees with respect to antenna No. 1. The point of observation P may be considered to be anywhere on a circle drawn from the origin O, and it is assumed that the distance from the point of observation to the array is great enough that lines $E_1$, $E_2$, $E_3$, and $E_4$ representing the fields respectively for the four antennas, drawn from O to P, No. 2 to P, No. 3 to P, and No. 4 to P are for all practical purposes parallel where P lies in a direction, $\phi=320°$. It is further assumed (for simplification) that the observation point P is an integral number of wave-lengths from O, which means that the signal from antenna No. 1 is in time phase with the current in antenna No. 1. Thus, the vector representing the signal from antenna No. 1, being a reference vector, may be drawn at an angle of zero degrees and its length will depend upon the strength of the signal from antenna No. 1. Antenna No. 2 is farther away from P than antenna No. 1 by a magnitude, $S_2 \cos(\phi_2 - \phi)$ degrees. As a result, the signal from antenna No. 2 will arrive at P behind the signal from antenna No. 1 due to the longer path. The delayed arrival of the signal from antenna No. 2 to P due to the longer path is compensated for or overcome by reason of the fact that the signal from antenna No. 2 starts with phase $\psi_2$ degrees ahead of signal from antenna No. 1. The combination of space and phase results in an equivalent phase of, $S_2 \cos(\phi_2 - \phi) + \psi_2$ degrees by which the signal from antenna No. 2 arrives with reference to the signal from antenna No. 1 at the observation point P. By a similar analysis, the signal from antenna No. 3 arrives with reference to the signal from antenna No. 1 at the observation point P by an equivalent phase of, $S_3 \cos(\phi_3 - \phi) + \psi_3$ degrees and the signal from antenna No. 4 arrives with reference to the signal from antenna No. 1 at the observation point P by an equivalent phase of, $S_4 \cos(\phi_4 - \phi) + \psi_4$ degrees.

Since $S_1 \cos(\phi_1 - \phi) + \psi_1 = 0$ and by letting $S_2 \cos(\phi_2 - \phi) + \psi_2 = \beta_2$, $S_3 \cos(\phi_3 - \phi) + \psi_3 = \beta_3$ and $S_4 \cos(\phi_4 - \phi) + \psi_4 = \beta_4$, then Equation 9 may be written:

$$E = \frac{\cos(h \sin \theta) - \cos h}{(1 - \cos h) \cos \theta} \sqrt{(E_1 + E_2 \cos \beta_2 + E_3 \cos \beta_3 + E_4 \cos \beta_4)^2 + (E_2 \sin \beta_2 + E_3 \sin \beta_3 + E_4 \sin \beta_4)^2} \quad (10)$$

For the horizontal pattern only since $\theta=0°$ Equation 10 may be expressed as follows:

$$E = \sqrt{\begin{array}{c}(E_1 + E_2 \cos \beta_2 + E_3 \cos \beta_3 + E_4 \cos \beta_4)^2 \\ + (E_2 \sin \beta_2 + E_3 \sin \beta_3 + E_4 \sin \beta_4)^2\end{array}} \quad (11)$$

By assuming that the value of the radical E in Equation 11 is the resultant of the sum of a group of vectors, then Equation 11 may be written vectorially in general as Equation 2; namely;

$$\dot{E} = \dot{E}_1 + \dot{E}_2 + \ldots + \dot{E}_k + \ldots \dot{E}_n$$

For a complete picture of the field pattern for an array, such as for example the pattern shown in Figure 7, the total field must be found for P, a number of times and where P is located at a different angle for the array each time. Usually the field is calculated for P located at intervals of 5 or 10 degrees or any other value throughout the horizontal plane. That is to say, the point P in Figure 2, being a point at which the field intensity is determined, is but one of several points located radially about the origin O for the four antennas Nos. 1, 2, 3, and 4. In the actual field layout, the antennas remain fixed and the observation point is moved in a clockwise direction about the origin of the array.

The embodiment of my invention as shown in Figure 1 is designed to determine the field pattern for a four-element array. It can like-wise be used directly for a two or three-element array. The principle may be also extended to apply to more than four elements. Although the device operates to solve radiation problems, its use is not limited to their solution only. It may be easily adapted to the solution of problems not related to radiation, which involve functions equivalent to those found in the equation for field intensity for antenna arrays or to those which may be solved vectorially. With particular reference to Figure 1, my electro-mechanical directional antenna pattern calculator comprises generally four main parts, namely a polar graphing turn table 21, a plurality of cosine generator units 22, an electrical vector system 23, and a resultant vector responsive device 24. My electro-mechanical calculator accomplishes its purpose by starting with a simple mechanical system, converting to an electrical system for flexibility, and finally converting back to a mechanical system to draw the field intensity pattern.

The polar graphing turn table 21 comprises a revolving plate 25 which is arranged to rotate around a pivot indicated by the reference character A₁ which also represents the location of antenna No. 1. The revolving plate 25 may be driven by a motor 28 through any suitable driving means indicated generally by the dash-dot line 29. Around the peripheral edge of the revolving plate 25 is a graduated degree scale indicated by the reference character 30 and may be designated as the $\phi$ scale which indicates the direction of the field as measured at the fixed arrow marked P which is placed adjacent to the revolving plate 25. The graph paper indicated by the reference character 27 may be removably mounted on the revolving plate 25 upon which the field intensity curve may be drawn by means of an inking device 31 driven by a motor 32 which is energized from the electrical supply conductor 33 and from the resultant vector responsive device 24. As the revolving plate 25 is rotated in a counter-clockwise direction as indicated by the arrow, the field intensity curve is automatically drawn upon the graph paper 27 by means of the inking device 31 which is actuated radially by the motor 32. The curve as drawn upon the graph paper 27 is of substantially the same contour as the curve shown in Figure 7 of the drawing. A planimeter 34 may be actuated by the part which moves the inking device 31 to measure the area bounded by the curve from which the R. M. S. value of the field may be readily computed. After the R. M. S. value is computed, the inking device 31 is set at a distance from the origin A₁ which is a measure of the R. M. S. value and then the turntable is rotated for drawing the circle 35 which has a radius that is a measure of the R. M. S. value and whose area defined by the circle is equal to the area bounded by the field intensity pattern.

The cosine generator units designated generally by the reference character 22 comprise three units 38, 39, and 40. Inasmuch as the mechanical construction of the cosine generator units are substantially alike, the description will be devoted primarily to the cosine generator 38 in order to prevent a duplication of the description. The cosine generator 38 comprises an orientation dial plate 41 which is pivotally mounted upon a pivot point indicated by the reference character A₁ which designates the position of the antenna No. 1. A spacing arm 44 is actuated by the orientation dial plate 41 for driving a motion transmitting means 49 which comprises a cross-member 51 that actuates a rack member 54 which engages a pinion gear 55. The outer end of the spacing arm 44 is provided with a driving pin indicated by the reference character A₂ which indicates the location of the antenna No. 2 with reference to the antenna No. 1 located at the origin of the orientation dial plate 41. The driving pin A₂ is arranged to slidably engage a slot 50 in the cross-member 51 which when the spacing arm 44 revolves causes the rack member 54 to reciprocate and rotate the pinion gear 55. The spacing arm 4 is arranged to pass through a clamping arrangement located at the center of the orientation dial plate 41 so that the length of the spacing arm may be adjusted by first unloosening an adjusting knob 45 after which the spacing arm may be shifted radially to adjustably position the location of the driving pin A₂ with reference to the origin A₁, which spacing arm 44 has a scale thereon graduated in electrical degrees. The orientation dial plate 41 may be driven by any suitable mechanical means illustrated by the reference character 48 from the polar graphing turntable 21, so that the orientation dial plate 41 rotates in unison with the polar graphing turntable 21 as indicated by the arrow mark. Around the periphery of the orientation dial plate 41 is a graduated degree scale indicated by the reference character 47 which is the φ₂ scale that indicates the orientation of the antenna No. 2. The angular rotation of the orientation dial plate 41 which carries the spacing arm 44 may be shifted with respect to the polar graphing turntable 21 by means of clutch screws 46 which when loosened permit the operator to swingably vary the angular position of the spacing arm 44 with respect to the polar graphing turntable 21. When the spacing arm 44 is properly positioned, the clutch screws 46 may be again retightened so that the spacing arm 44 is driven mechanically in unison with the polar graphing turn table 21.

A driving pin A₃ carried upon the free end of the spacing arm for the cosine generator unit 39 represents the position of the antenna No. 3 with respect to the origin which is the location of the antenna No. 1. Similarly, for the cosine generator unit 40, the driving pin A4 designates the location of the antenna No. 4 with reference to the origin which designates the location of the antenna No. 1. The angular position represented by $\phi_2$ is read upon the graduated degree scale on the orientation dial plate 41 at the fixed arrow mark $\phi_2$ which is fixed to the machine. By the same arrangement, the orientation dial plates 42 and 43 for the cosine generator 39 and 40, respectively, may also carry graduated degree scales whereby the angular position of the spacing arms which carry the driving pins A3 and A4 may be observed with reference to the fixed arrow points $\phi_3$ and $\phi_4$ carried by the machine and located adjacent to the peripheral edge of the orientation dial plates 42 and 43, respectively. The orientation dial plates 42 and 43 are likewise driven in unison through any suitable means from the revolving plate 25 of the polar graphing turntable 21. The spacing arms for the cosine generators 39 and 40 may be adjustably set both angularly and radially the same as that described with reference to the cosine generator 38.

The pinion gear 55 which is actuated by the cosine generator 38 is arranged to drive an armature 61 of a phase shifting transformer having a field 62 energized by a three-phase supply source indicated by the conductors 63, 64, and 65. The phase shifting transformer may be of any suitable type, several of which are available commercially. I have chosen to depict an electromechanical device physically similar to "selsyn" or "autosyn," which comprises a three phase stator used as a primary in this application, and a single phase wound rotor used as a secondary in this application. As the angular position of the rotor is varied, the phase of the voltage produced therein is varied with respect to any phase of the three phase stator. A phase clutch 56 is positioned between the pinion gear 55 and the armature 61 of the phase shifting transformer so that the angular position of the armature 61 may be shifted with respect to the pinion gear 55 which has a fixed position with reference to the revolving plate 25 of the polar graphing turntable 21. As diagrammatically shown, the phase clutch 56 comprises two relatively circular movable parts releasably clamped together by means of an adjusting knob 60. The inner circular part 56 is driven by the pinion gear 55 and the outer circular part 57 is arranged to drive the armature 61 of the phase shifting transformer. The outer circular part 57 of the phase clutch 56 carries a graduated scale 57 which when observed with reference to the arrow carried by the inner circle and indicated by $\psi_2$ gives the time phase relation of $\psi_2$ wherever it may appear in the equation being solved. The graduated scale 57 with reference to the stationary mark $\beta_2$ gives the angular position of the armature 61 of the phase shifting transformer and takes care of the factor $\beta_2$ in the equations which are to be solved. The voltage output of the armature 61 is impressed across an adjustable resistor 67 which is of the potentiometer type and which has a slidable pointer 68 to give an output voltage which may be adjustably varied by the operator. The value of the voltage given by the adjustable or slidable pointer 68 is a measure of the voltage $E_2$ on the horizontal pattern. The voltage given by the slidable pointer 68 is impressed across an adjustable resistor 69 which is also of the potentiometer type and has a slidable pointer 70. The slidable pointer 70 gives a variable voltage which compensates for the field at the various elevational angles, $\theta$. The voltage given by the adjustable pointer 70 is impressed across a volt meter 83 which gives the magnitude of the voltage $E_2$. The length of the arrow passing through the voltmeter 83 is proportional to the magnitude of the voltage and the angle of the arrow represents the angle $\beta_2$ as observed upon the phase clutch 56 positioned between the pinion gear 55 and the armature 61 of the phase shifting transformer. The electrical parts associated with the armature 61 of the phase shifting transformer may be designated generally as an electrical vector unit and is indicated by the reference character 76. The electrical vector unit 76 takes care of the factors involving the antenna No. 2. Similarly, the electrical vector units 77 and 78 take care of the electrical conditions involving the antennas No. 3 and No. 4, respectively. The electrical vector units 77 and 78 are the same general construction as that shown and described for the electrical vector unit 76. The electrical vector unit 77 has an adjustable resistor 87 of the potentiometer type across the armature of the phase shifting transformer and the slidable pointer 88 thereon gives a voltage that is the measure of $E_3$ on the horizontal pattern. The adjustable resistor 89 which is of the potentiometer type and which has a pointer 90 is arranged to give a voltage which compensates for the field at the various elevational angles, $\theta$. Similarly, for the electrical vector unit 78, the adjustable resistor 91 is connected across the armature of the phase shifting transformer and the slidable pointer 92 thereon provides for giving a voltage which is a measure of $E_4$ on the horizontal pattern. The field at the various elevational angles of $\theta$ is compensated for by the adjustable resistor 93 having a pointer 94. The voltmeters 84 and 85, respectively, read the value for $E_3$ and $E_4$. The arrow which passes through the voltmeter 84 is proportional to the magnitude of the voltage $E_3$ and the angle is a measurement of $\beta_3$. The arrow which passes through the voltmeter 85 has a magnitude that is proportional to the voltage $E_4$ and the angle is a measurement of $\beta_4$ in the equation to be solved. The electrical vector unit designated by the reference character 75 is arranged to be energized from the three-phase supply conductors 64 and 65 and comprises a potentiometer resistor 95 which has a slidable pointer 96 that gives a voltage which is a measurement of $E_1$ on the horizontal pattern. The field at various elevational angles of $\theta$ is compensated for by the potentiometer resistor 97 having a slidable pointer 98 which is connected to the voltmeter 82 that reads the value of $E_1$. The arrow which passes through the voltmeter 82 has a length which is a function of the magnitude of the voltage $E_1$ and the angle of the arrow with respect to the horizontal represents $\phi_1$ which is zero degrees. The output of the electrical vector units 75, 76, 77, and 78 are connected in series and the resultant voltage is read by a resultant voltmeter 86. The circuit which connects the electrical vector units in series to give the resultant voltage may be traced as follows: beginning with the conductor 100 which is connected to one side of the resultant voltmeter 86 the circuit extends through the voltmeter 82, conductors 101 and 99, a switch 102, the voltmeter 85, switches 103 and 104, the voltmeter 84, switches 105 and 106, the voltmeter 83, a switch 107 and a conductor 108 to the other side of the resultant voltmeter 86. The resultant voltage is impressed upon the resultant vector responsive device 24 which may be a power amplifying device which supplies current to the motor 32 that drives the inking device 31 for making the graph of the field intensity pattern upon the graph paper 27 of the polar graphing turntable 21. The direction of rotation of the motor 32 is determined by the resultant vector responsive device 24, to radially operate the inking device 31 on the graph paper as it is revolved by the polar graphing turntable 21.

In explaining the operation of my electro-mechanical antenna pattern calculator, let it be assumed that the antenna heights are all equal to 120 degrees and that the value of the relative field intensity, E, is to be calculated for the horizontal pattern under the following prevailing conditions, in which:

The physical location of the four elementary antenna-array for the above set of values is shown in Figure 2, where $\phi_2=180°$, $\phi_3=80°$, and $\phi_4=230°$; $S_2=180°$, $S_3=110°$, and $S_4=200°$; $\psi_2=240°$, $\psi_3=130°$, and $\psi_4=30°$; and $E_1$, $E_2$, $E_3$, and $E_4$ equal 1.0, 1.25, 1.75, and 1.5 respectively. Before setting the values off on my machine the revolving plate 25 of the polar graphing turntable 21 is locked by actuating the cam lock 36 against the peripheral edge of the revolving plate 25, to make the $\phi$ scale 30 read zero for making all of the orientation adjustments. The orientation angle $\phi_2$ for the antenna No. 2 is set off on the orientation dial plate 41 of the cosine generator unit 38 to make the graduated scale read 180 degrees. This may be done by operating the orientation clutch screws 46. Similarly, the orientation angle $\phi_3$ is set off at 80 degrees on the orientation dial plate 42 for the cosine generator unit 39 and the orientation angle $\phi_4$ is set off at 230 degrees on the orientation dial plate 43 of the cosine generator unit 40. After the orientation angles are once set off on the cosine generator units 38, 39, and 40, the revolving plate 25 may be unlocked by operating the cam lock 36 to the release position. The antenna spacing $S_2$ is set off on the cosine generator unit 38 by making the spacing arm 44 read 180 degrees between $A_1$ and $A_2$. Similarly, the antenna spacings $S_3$ and $S_4$ are set off, respectively, on the cosine generator units 39 and 40 by making the spacing between $A_1$ and $A_3$ read 110 degrees and the spacing between $A_1$ and $A_4$ read 200 degrees. If the orientation dial plates 41, 42, and 43 together with their spacing arms were placed vertically above each other and also placed above the turntable 21, the combined showing of the spacings for all of the antennas and their angular positions with respect to each other would be the same as that diagrammatically illustrated in Figure 3 which may be considered as an equivalent mechanical arrangement $f$ of the array shown in Figure 2. In my cosine generator arrangement, which is diagrammatically illustrated in Figure 3, the angles $\phi_2$, $\phi_3$, and $\phi_4$ are measured in a counter-clockwise direction whereas in Figure 2 which represents the actual field location of the antenna, the angles $\phi_2$, $\phi_3$ $\phi_4$ are measured in clockwise direction. The reason for this is that, in the field, the observer at the point P is considered as moving bodily in a circle around the origin of the antennas, whereas in my machine the observer is considered as remaining stationary and the antennas $A_2$, $A_3$ and $A_4$ are rotated bodily about the antenna $A_1$ as the origin. The time phase angle $\psi_2$ is set off on the phase clutch 56 by operating the adjusting knob 61 and moving the two relatively movable parts of the clutch until the graduated scale 57 reads 240 degrees with respect to the arrow designated as $\psi_2$, after which the knob 60 is tightened to keep the two parts of the clutch anchored together for operating the armature 61 of the phase shifting transformer. In the same manner, the time phase factors $\psi_3$ and $\psi_4$ are set off at 130° and 30°, respectively, on the clutches which operate the armature of the electrical vector units 77 and 78, respectively. The pointers 98, 78, 90, and 94 for the potentiometer resistors 97, 69, 89, and 93, respectively, which compensate for the field at the various elevational angles are set at their maximum value since the machine is now being described for producing the horizontal pattern. After the pointers 98, 70, 90 and 94 are once set for the horizontal position, the adjustable pointers 96, 68, 88, and 92 for the potentiometer 95, 67, 87, and 91 are so shifted to make the voltmeters 82, 83, 84, and 85 to read, respectively, 1.0, 1.25, 1.75, and 1.5, which are the values for $E_1$, $E_2$, $E_3$ and $E_4$ respectively. The machine is now all set for producing the graph of the field intensity for the horizontal pattern on the revolving plate 25 of the polar graphing turntable 21. Prior to starting the machine, a sheet of graph paper 27 is arranged on the revolving plate 25 after which the inking device 31 is set on the paper and the planimeter 34 is set to zero. The motor 28 is now started and drives the revolving plate 25 through one complete cycle of 360 degrees which gives a graph substantially as shown in Figures 1 and 7 of the drawing, the Figure 7 being shown inverted to correspond to the actual condition in the field as shown by Figure 2. A clutch may be mounted between the motor 28 and the revolving plate 25 so that the turntable may be revolved by hand when desired. To determine the R. M. S. value for the horizontal pattern, the planimeter is read and from this reading computations may be readily made for determining the R. M. S. value for the field. The inking device 31 may then be set at a fixed distance away from the origin $A_1$ to equal the computed R. M. S. value, whereupon the revolving plate 25 may be rotated through a complete cycle of 360 degrees for drawing the circle 35 which has an area equivalent to the area bounded by the horizontal pattern drawn by the inking device 31 when the machine is operated. The Figure 4 is a vector diagram illustrating the voltage magnitudes and the voltage angles of the electrical vector units 75, 76, 77 and 78 for the condition that $\phi$ equals zero as set off on the revolving plate 25 of the polar graph turntable 21. The Figure 6 is similar to Figure 4 and shows the voltage magnitudes and angles of the electrical vector units 75, 76, 77 and 78 when the direction angle $\phi$ is 320 degrees as shown in Figure 5.

The angles for $\beta_2$, $\beta_3$, and $\beta_4$ for constructing the vector diagrams in Figures 4 and 6 may be directly read off the machine at the phase clutches between the pinion gears and the armatures of the phase shifting transformers. The $\beta$ angles for any other value of $\phi$ may be determined in the same manner.

Figure 8:
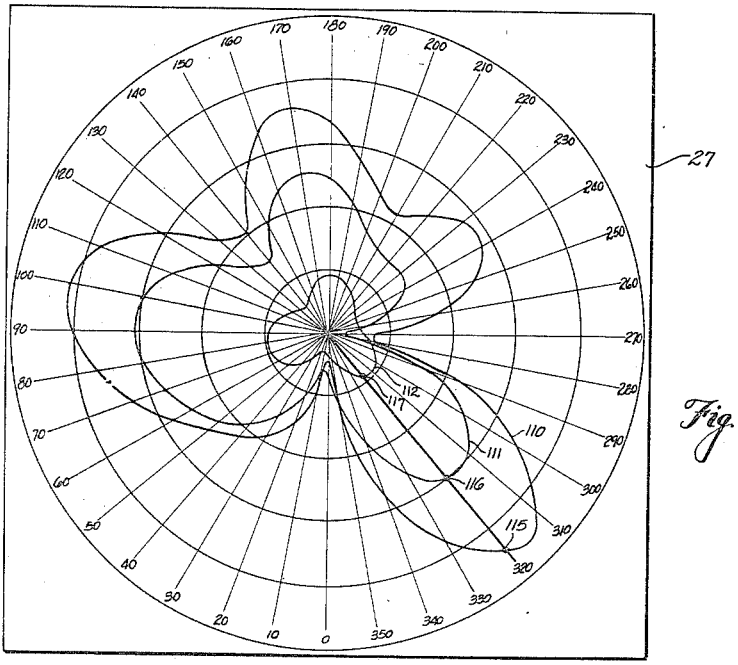
Figure 8 is similar to Figure 7 but shows in addition, elevational field intensity patterns for elevational angles of $\theta=30°$ and $\theta=60°$.
Figure 9:
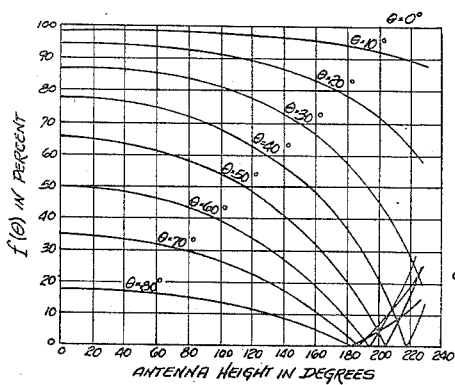
Figure 9 is a reference chart used in the setting of the machine and shows the relation between the antenna height in degrees and $f(\theta)$ in per cent of the value along the horizon for various elevation angles of $\theta$.
Figure 12:
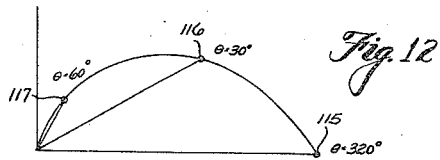
Figure 12 is a vertical pattern at $\phi=320°$, when all antennas are 120° in height.

Besides the horizontal pattern, my machine may be used for determining the vertical pattern for any horizontal direction of $\phi$. When using my machine to determine the vertical pattern, I preferably employ the following procedure: First I draw the horizontal pattern as previously explained and then I draw a series of other patterns at various elevational angles. In Figure 8, I show the horizontal pattern as being indicated by the reference character 110, a second pattern by the reference 111 and a third pattern by the reference character 112. The second pattern is taken for the elevational angle θ equals 30 degrees and the third pattern 112 is taken at the elevational angle θ equals 60 degrees. While I have drawn only two elevational patterns at 30 and 60 degrees, it is to be understood that any number of patterns may be drawn at the angle between the horizontal and 90 degrees. In drawing the additional patterns as shown on Figure 8, I shift the location of the pointers 98, 70, 90 and 94 along their respective potentiometer resistors to compensate for the field at the various elevational angles. In determining the actual position of the compensating pointers, I have developed a readily usable chart as shown in Figure 9 which enables me to set the pointers off to compensate for the field at the various elevational angles with ease. The chart in Figure 9 shows the relationship between the antenna heights in degrees to $f(\theta)$ in per cent which is the elevational compensating factor. Thus, for example, for an antenna height of 120 degrees and for an elevational angle of 30° the compensating factor is approximately 78 per cent times the value of the setting of the pointers for the horizontal pattern. In other words, the second pattern 111 is compressed radially to approximately 78 per cent of the horizontal pattern 110. For the third pattern 112 which is taken at an elevational angle of 60° the compensation for the setting of the pointers is approximately 34 per cent of the value for the setting at the horizontal pattern. By the use of the chart in Figure 9 any number of patterns may be drawn. In addition to compensating for the position of the pointers for the potentiometer resistors 97, 69, 89 and 93, I also compensate for the apparent spacing between the antenna No. 1 at the origin and the antennas Nos. 2, 3, and 4 by shifting the length of the swinging arms of the cosine generator units 38, 39, and 40. In other words, as the observation point P increases in elevation, the distances to the respective antennas gradually approach each other in value and become equal at θ=90 degrees, which means that the apparent spacing between the antennas becomes zero. The changes in spacing from the antenna $A_1$ at the origin and the antennas $A_2$, $A_3$, and $A_4$ at the end of the swinging arms in the cosine generators is computed from the cosine function of the elevational angle at which the pattern is being drawn. After the potentiometer pointers are reset to compensate for the various elevational angles and after the spacings are set upon the cosine generators, the machine is ready to draw an additional pattern taken at the selected elevational angle θ. The vertical pattern in Figure 12 is taken for a value φ equal to 320 degrees and the values for determining the contour of the vertical pattern may be measured directly off on Figure 8 taken along the radial line marked 320 which has been drawn heavier than the other line. The points 115, 116, and 117 where the radial line 320 crosses the three patterns 110, 111, and 112, give the radial lengths at which the corresponding points are determined for the vertical pattern in Figure 12. The distance from the origin in Figure 8 out to the point 115 represents the value of E at an elevation angle of θ=0 degrees and is shown by the resultant line E in Figure 6. The distance from the origin in Figure 8 out to the point 116 represents the value of E at an elevational angle of θ=30 degrees and is shown by the resultant line E in Figure 10.

Figures 10, 11:
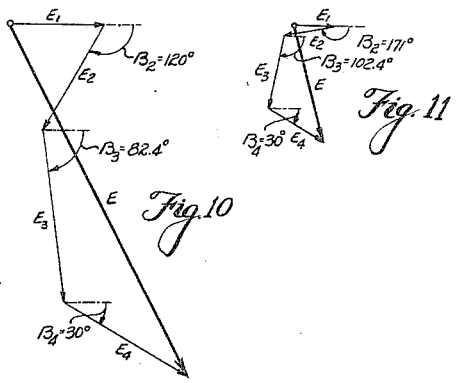
Figure 10 is a representation similar to Figure 6 with the four-element antenna array rotated through an angle of $\phi=320°$, being a representation of the electrical vectors corresponding to a setting of my machine utilized in solving for one elevational angle $\theta=30°$.
Figure 11 is a view similar to Figure 10, but is based upon an elevational angle $\theta=60°$.

The Figure 11 is similar to Figure 10 but shows the resultant for an elevational angle θ=60 degrees and the resultant line E is the same as the distance from the origin to the point 117 in Figure 8. The vertical pattern may be drawn for any other value of φ by determining the radial distances from the origin of the graph in Figure 8 to the points where the radial angle of φ intersects the respective patterns taken at the various elevational angles of θ. The Figures 7, 8, and 12 are drawn one-half scale with respect to Figures 4, 6, 10, and 11.

While I have described my invention as being designed for the solving of the antenna patterns for a four element array, it is to be understood that the invention may be changed to cover more or less than a four element array, for example, any one of the electrical vector units such as, for example, 78 may be rendered inoperative and removed from the system by throwing the switches 102 and 103 to include the resistor 120 in the circuit which substantially matches the resistance of the electrical vector unit which was removed from the circuit. The resistor 120 enables the remaining electrical vector units 75, 76, and 77 to remain operative as a three element array. My invention may be used to solve a two element array by excluding two of the electrical vector units such, for example, as 77 and 78. In general an $n$ element array can be solved by adding $(n-1)$ cosine generator units similar to the three units 38, 39, and 40 which are used for a four element array.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. An electro-mechanical antenna array pattern calculator, including a plurality of similar units and a reference unit, each of said similar units containing two means, one for generating a variable voltage and one for adjusting said voltage, said generating means including a rotative phase shifting element, and said adjusting means including mechanism for rotating the phase shifting element in accordance with an adjustable cosine movement, a series electrical connection between the generating units and the reference unit, said reference unit containing means responsive to the sum of the generated voltages for indicating the magnitude and direction thereof.

2. A machine for vector summation of $n$ vectors, comprising, $n$ cosine generator units, means for driving said $n$ cosine generator units in synchronism, $n$ electrical vector systems each having electrical outputs and each being actuated by one of said cosine generator units, respectively, a potential source for energizing said electrical vector systems, a resultant vector responsive device having an electrical input and being responsive to said $n$ electrical vector systems, and means for serially connecting the outputs of said $n$ electrical vector systems to the input of said resultant vector responsive device, said $n$ electrical vector systems each comprising electromechanical phase shift means having a rotor and a stator, rotatably positionable phase clutch means connected between said rotor and said cosine generator unit, said rotor having an electrical output of variable phase, energization means for energizing said stator of said phase shift means from said potential source, and first and second electrical magnitude control means for controlling the magnitude of the electrical output of said phase shift means.

3. A machine for vector summation of $n$ vectors, comprising, $n-1$ cosine generator units, means for driving said $n-1$ cosine generator units in synchronism, $n-1$ electrical vector systems each having electrical outputs and each being actuated by one of said cosine generator units, respectively, reference means for establishing a reference vector of variable magnitude, a potential source for energizing said reference means, said reference means including first and second magnitude control means for controlling the magnitude of the reference vector, a resultant vector responsive device having an electrical input and being responsive to said $n-1$ electrical vector systems and said reference vector to indicate the resultant thereof, and means for serially connecting the outputs of said $n-1$ electrical vector systems and the output of said reference means to the input of said resultant vector responsive device, said $n-1$ electrical vector systems each comprising electromechanical phase shift means having a rotor and a stator, rotatably positionable phase clutch means connected between said rotor and said cosine generator unit, said rotor having an electrical output of variable phase, energization means for energizing said stator of said phase shift means from said potential source, and first and second electrical magnitude control means for controlling the magnitude of the electrical output of said phase shift means.

4. A machine for vector summation of $n$ vectors, comprising, $n-1$ cosine generator units, means for driving said $n-1$ cosine generator units in synchronism, $n-1$ electrical vector systems each having electrical outputs and each being actuated by one of said cosine generator units, respectively, reference means for establishing a reference vector of variable magnitude, a potential source for energizing said reference means, said reference means including first and second magnitude control means for controlling the magnitude of the reference vector, a resultant vector responsive device having an electrical input and being responsive to said $n-1$ electrical vector systems to indicate the resultant thereof, and means for serially connecting the outputs of said $n-1$ electrical vector systems and the output of said reference means to the input of said resultant vector responsive device, said $n-1$ cosine generator units each comprising rotatable means having a radially adjustable spacing arm thereon, means for varying the angular position of said rotatable means with respect to each other, a reciprocating rack arm driven by said spacing arm, and a pinion gear rotated by said rack arm, said $n-1$ electrical vector systems each comprising electromechanical phase shift means having a rotor and a stator, rotatably positionable phase clutch means connected between said rotor and said pinion gear, said rotor having an electrical output of variable phase, energization means for energizing said stator of said phase shift means from said potential source, and first and second electrical magnitude control means for controlling the magnitude of the electrical output of said phase shift means.

5. A machine for vector summation of $n$ vectors, comprising a polar graphing turntable with a polar graph thereon, $n-1$ cosine generator units, means for driving said turntable and said $n-1$ cosine generator units in synchronism, $n-1$ electrical vector systems each having electrical outputs and each being actuated by one of said cosine generator units, respectively, reference means for establishing a reference vector of variable magnitude, a potential source for energizing said reference means, said reference means including first and second magnitude control means for controlling the magnitude of the reference vector, a resultant vector responsive device having an electrical input and output and being responsive to said $n-1$ electrical vector systems and said reference vector, means for serially connecting the outputs of said $n-1$ electrical vector systems and the output of said reference means to the input of said resultant vector responsive device, and recording means for translating said electrical output of said resultant vector responsive device into a mechanical movement for recording thereof on said polar graph, said $n-1$ electrical vector systems each comprising electromechanical phase shift means having a rotor and a stator, rotatably positionable phase clutch means connected between said rotor and said cosine generator units, said rotor having an electrical output of variable phase, energization means for energizing said stator of said phase shift means from said potential source, and first and second electrical magnitude control means for controlling the magnitude of the electrical output of said phase shift means.

6. A machine for vector summation of $n$ vectors, comprising, a polar graphing turntable with a polar graph thereon, $n-1$ cosine generator units, means for driving said turntable and said $n-1$ cosine generator units in synchronism, $n-1$ electrical vector systems each having electrical outputs and each being actuated by one of said cosine generator units, respectively, reference means for establishing a reference vector of variable magnitude, a potential source for energizing said reference means, said reference means including first and second magnitude control means for controlling the magnitude of the reference vector, a resultant vector responsive device having an electrical input and output and being responsive to said $n-1$ electrical vector systems and said reference vector, means for serially connecting the outputs of said $n-1$ electrical vector systems and the output of said reference means to the input of said resultant vector responsive device, and recording means for translating said electrical output of said resultant vector responsive device into a mechanical movement for recording thereof on said polar graph, said $n-1$ cosine generator units each comprising rotatable means having a radially adjustable spacing arm thereon, means for varying the angular position of said rotatable means with respect to said turntable, a reciprocating rack arm driven by said spacing arm, and a pinion gear rotated by said rack arm, said $n-1$ electrical vector systems each comprising electro-mechanical phase shift means having a rotor and a stator, rotatably positionable phase clutch means connected between said rotor and said pinion gear, said rotor having an electrical output of variable phase, energization means for energizing said stator of said phase shift means from said potential source, and first and second electrical magnitude control means for controlling the magnitude of the electrical output of said phase shift means.

7. A machine for producing a resultant vector condition from a plurality of individual vector conditions comprising, in combination, a plurality of means comprising at least first, second and third means establishing respectively first, second and third individual vector conditions, means for varying the relative magnitudes of the said vector conditions, said means including phase rotating elements for varying the relative phase of each of said plurality of means, first, second and third adjustable cosine generator units for generating movements corresponding to an adjusted cosine function, means for transmitting the generated cosine movements to the respective phase rotating elements, a resultant vector responsive device, and connection means for connecting the said plurality of means to the said resultant vector responsive device.

8. A machine for producing a resultant vector condition from a plurality of individual vector conditions comprising, in combination, a plurality of means comprising at least first, second, third and fourth means establishing respectively first, second, third and fourth individual vector conditions, means for varying the relative magnitudes of the said vector conditions, means including phase rotating elements for varying the relative phase of each but one of said plurality of means, first, second and third adjustable cosine generator units for generating movements corresponding to an adjusted cosine function, means for transmitting the generated cosine movements to the respective phase rotating elements, a resultant vector responsive device, and connection means for connecting the said plurality of means to the said resultant vector responsive device.

CARL E. SMITH.

REFERENCES CITED

The following references are of record in the file of this patent:

UNITED STATES PATENTS

| Number | Name | Date |
|---|---|---|
| 1,559,325 | Jewett | Oct. 27, 1923 |
| 2,307,536 | Parker | Jan. 5, 1943 |
| 1,667,497 | Shapiro | Apr. 24, 1928 |
| 2,337,968 | Brown | Dec. 28, 1943 |

FOREIGN PATENTS

| Number | Country | Date |
|---|---|---|
| 400,714 | British | Nov. 2, 1933 |

OTHER REFERENCES

Maxwell, "An Electrical Method for Compounding Sine Functions," R. S. I., vol. 11, #2, Feb. 1940, page 47, Q184, R454.

Herr et al., "An Electrical Algebraic Equation Solver," R. S. I., vol. 9, Oct. 1938, pages 310 to 315.

Horizontal Polar Pattern Tracer, pages 227 to 232 of Proceedings of the I. R. E. for May 1942.

A Mechanical Calculator for Directional Antenna Patterns, pages 233 to 237 of Proceedings of the I. R. E. for May 1942.